Inventor
Cooper B. Bright,

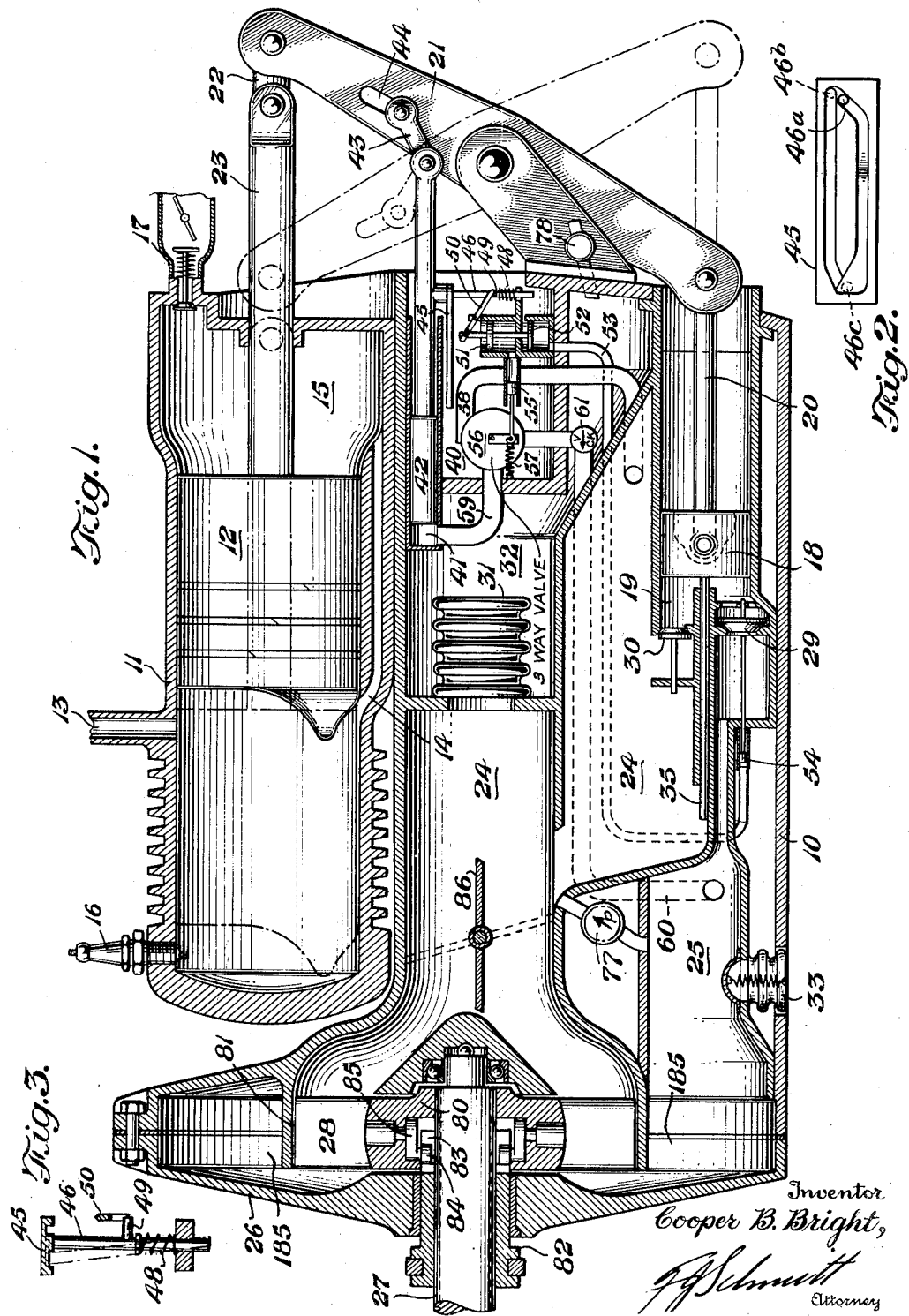

July 1, 1952 C. B. BRIGHT 2,601,756
COMBINED FLUID MOTOR AND EXPANSIBLE GAS ENGINE
Filed May 8, 1946 3 Sheets-Sheet 3
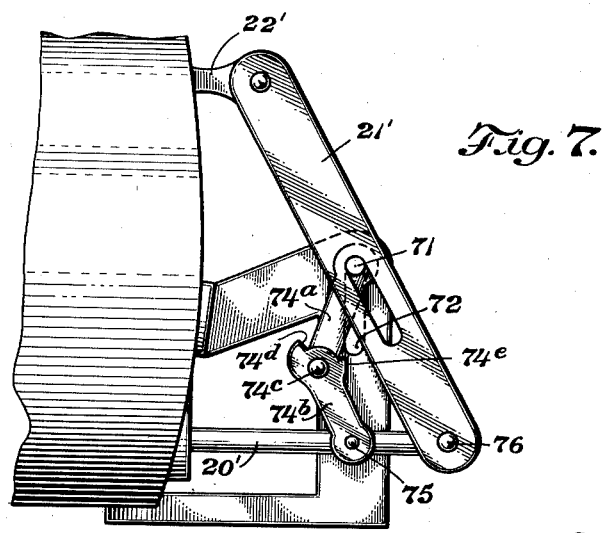
Fig. 7.
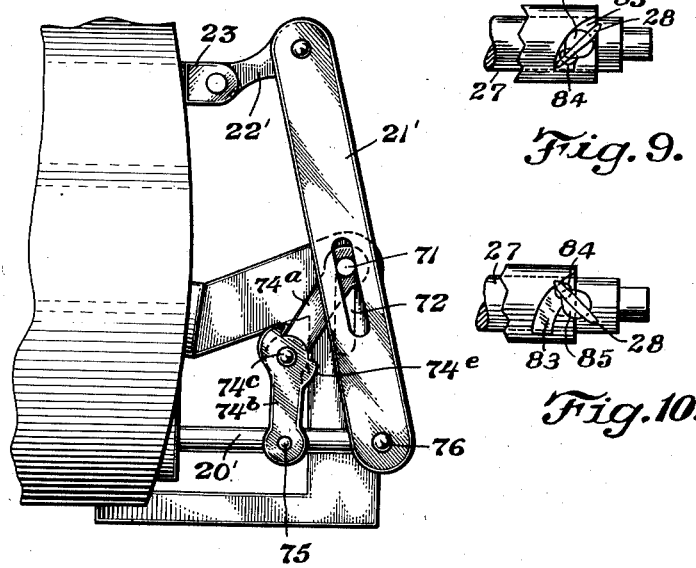
Fig. 8.
Fig. 9.
Fig. 10.
Inventor
Cooper B. Bright,
By
F. J. Schmitt
Attorney

Patented July 1, 1952

2,601,756

UNITED STATES PATENT OFFICE 2,601,756

COMBINED FLUID MOTOR AND EXPANSIBLE GAS ENGINE

Cooper B. Bright, United States Navy

Application May 8, 1946, Serial No. 668,054

16 Claims. (Cl. 60—12)

(Granted under the act of March 3, 1883, as amended April 30, 1928; 370 O. G. 757)

This invention relates to power plants of general utility and particularly to those of the type in which intermittent energy of an expansible gas is transformed into useful work at a desired rate. Briefly, the system comprises an expansible gas engine, a liquid pump driven by the engine, a reservoir for receiving the liquid under pressure, a fluid motor driven by the high pressure liquid, and suitable means for automatically starting the engine or operating it during the non-working portion of its cycle of operation.

An object of the invention is the provision of a power plant, which intermittently receives energy in one portion thereof, and either stores this energy for subsequent use in the form of potential energy of a liquid under pressure, or transforms the intermittent energy into useful work at a constant or other desired rate.

Another object is the provision of a power plant which includes a motor for doing work at a desired rate coordinated with an engine in such manner that the engine automatically supplies the motor with energy in accordance with the power requirements thereof.

Another object is the provision of a power plant which has a motor capable of delivering full torque when starting, coordinated with a combustion engine for driving same which automatically starts simultaneously with the motor.

Another object is the provision of a combustion engine which utilizes stored energy of a liquid under pressure to automatically recharge a combustion chamber in event of a misfire.

Another object is to achieve high thermal efficiency by the provision of an expansible gas engine which is capable of operating on a cycle such that exhaust pressures are at an optimum low value despite high resisting forces tending to stop the engine.

Another object is the provision of a liquid circulatory system in which the liquid may be employed to operate a motor or in any other system which requires a differential head on the liquid.

Further objects are the provision of a power plant which has a minimum number of parts all of which are readily accessible, has high power output per unit of weight, is subject to wide variation of arrangement of its component parts, and has inherent cushioning features for the expanding forces of a gas.

Still further objects, advantages, and salient features will become apparent from a consideration of the description to follow, the accompanying drawings, and the appended claims.

In the drawings:

Fig. 1 is a side view, partly in section, of a device embodying my invention;

Fig. 2 is a detail of Fig. 1;

Fig. 3 is another detail of Fig. 1;

Fig. 7 is another alternate construction of a portion of the bell crank linkage of Fig. 1, shown in one position;

Fig. 8 is a view similar to Fig. 7 showing the linkage in another position;

Fig. 9 is a view showing the turbine blades for rotation in one direction; and

Fig. 10 is a view showing the turbine blades positioned for rotation in a direction opposite to that shown in Fig. 9.

Figure 4:
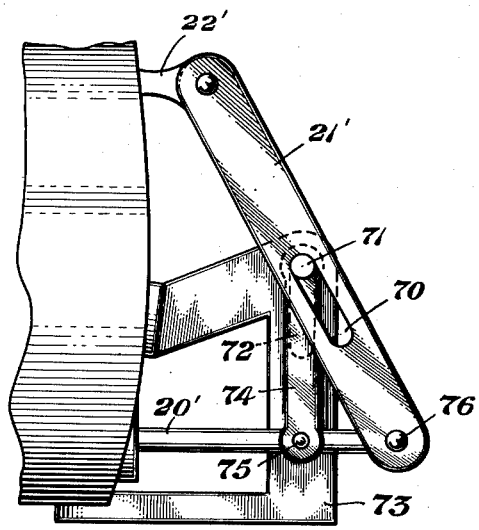
Fig. 4 is an alternate construction of a portion of the bell crank linkage of Fig. 1, shown in one position.

Referring to the drawings, a generally cylindrical support 10 for the various parts of the device is recessed at the top for the reception of an expansible gas prime mover, shown in the form of an air-cooled, two-cycle internal combustion engine cylinder 11 having a conventional piston 12, exhaust port 13, intake port 14, compression chamber 15, spark plug 16 and carburetor connection 17. To promote clearness in the drawings, the ignition system including batteries, coils, contact points, etc., are not shown, but it will be understood that any conventional system which would effect ignition at a predetermined point in the travel of piston 12 could be employed. The carburetor, also not shown, could be of any conventional type.

On the opposite side, and within the confines of support 10, is located a liquid pump illustrated as a piston 18 reciprocable in a cylinder 19. This piston is operably connected to piston 12 by means of connecting rod 20, bell crank 21, link 22 and piston rod 23.

A high pressure liquid reservoir 24 and a low pressure liquid reservoir 25 are provided within support 10 and in communication with these reservoirs at one end of the support is a reversible liquid turbine 26 constructed to operate from liquid in reservoir 24 and thus drive shaft 27 to which may be coupled any sort of power driven device. The turbine, to be subsequently described in greater detail, is of the type wherein the delivered power is determined by the amount of liquid flow therethrough, which in turn is determined by the setting of the adjustable turbine blades 28. The liquid after passing through the turbine enters low pressure reservoir 25 and is then returned to high pressure reservoir 24 by piston 18 through suitable check valves 29 and 30. A flexible diaphragm, shown in the form of a bellows 31 forms a part of reservoir 24 and expands against air under pressure in air tank 32. This accommodates any liquid which is not directed into turbine 26 and also acts as a means by which a part or all of the intermittent energy imparted to the liquid in reservoir 24 may be stored for subsequent use. The volume of air in tank 32 should be sufficient to ensure as little fluctuation of pressure as possible so that the liquid in reservoir 24 remains under substantially constant pressure regardless of its change in volume. This is desired to provide a smooth flow of power from the turbine. Bellows 31 also serves the purpose of dividing the air and liquid into separate compartments and hence eliminates emulsification of the liquid or the entrainment of air bubbles therein, which are both objectionable. It is necessary that the low pressure reservoir 25 be of variable volume, also, to accommodate any excess liquid delivered thereto by turbine 26 and which is not directed immediately to pump piston 18, and to this end a bellows 33 is provided in a wall of reservoir 25. This bellows is urged in one direction by a spring so that the liquid received in reservoir 25 will always be sufficient for the requirements of pump piston 18.

It is apparent that since no flywheel is employed to return piston 12 to the end of its compression stroke for a subsequent power stroke, some means are necessary to perform this function, and to this end a plunger 35 attached to piston 18 and extending into reservoir 24 is provided. At the end of the power stroke, a portion of the energy stored in the liquid in reservoir 24 is utilized to force plunger 35 and the linkage connected between same and piston 12 to return the latter to the end of its compression stroke at which point ignition occurs and the cycle is repeated. Thus, piston 12 and the liquid in reservoir 24 replaces the conventional flywheel and has the advantage that operation of the system does not depend upon heavy and cumbersome inertia parts, and further, does not require continuous operation as in the case of a flywheel; that is, energy can be stored in reservoir 24 and later used to recharge the engine when it becomes necessary, rather than continuously recharge same as would result if a flywheel were used. It becomes apparent, accordingly, that as the power requirements of shaft 27 vary, the rate of fluid flow in the circuit will vary. When the flow is decreased, for example, the amount of fluid available for flow into cylinder 19 is less, thus decreasing the travel speed of piston 18 outwardly, this decrease being due to a partial fluid lock in the low pressure part of the circuit. Thus the frequency of the expansible gas engine is automatically varied to supply the power requirements for the new load.

The normal operation of the parts so far described is summarized as follows, it being assumed that the turbine vanes 28 are open to the extent of the power required, piston 12 is at the end of its stroke, as shown, and a combustible charge has been transferred from compression chamber 15 to the combustion cylinder: Liquid under pressure in high pressure reservoir 24 forces plunger 35 outwardly, which in turn, through piston 18, piston rod 20, linkage 21, 22, and 23, forces piston 12 to the end of the compression stroke, as shown by the broken line in cylinder 11. A new combustible charge enters compression chamber 15 through carburetor connection 17 as a result of inward movement of piston 12. At the end of the compression stroke ignition occurs forcing piston 12 outwardly compressing the mixture in chamber 15 and at approximately the position shown products of combustion exhaust through port 13, and the compressed mixture is transferred to the cylinder through port 14 at which time the cycle is completed. During this cycle piston 18 has transferred liquid from low pressure reservoir 25 to high pressure reservoir 24 from which it passes through the turbine to do useful work. While piston 18 delivers energy to reservoir 24 intermittently, turbine 26 delivers power at a uniform or other desired rate since the pressure in 24 remains constant due to bellows 31 and air tank 32.

In event that no power is desired at shaft 27, stopping and starting of the system is automatic which is summarized as follows, it being assumed that the turbine blades are closed to preclude liquid flow therethrough: Liquid in high pressure reservoir tends to move plunger 35 outwardly as before described, but since the turbine is not discharging liquid into low pressure reservoir 25, piston 18 tends to create a fluid lock in reservoir 25 and cylinder 19 which will restrain outward movement of piston 18 since atmospheric pressure acts on the outer side thereof. Thus, the entire system stops automatically. When the turbine blades are again opened to resume operation, liquid again flows through the turbine and into reservoir 25 and cylinder 19. The fluid lock therefore no longer exists which permits plunger 35 to again force piston 12 to the end of its compression stroke as explained under normal operation.

From the foregoing it is apparent that under conditions where the power output of turbine 26 remains substantially constant, piston 12 will automatically operate on a conventional two-stroke Otto cycle; however, under certain conditions, for example, when a misfire occurs by reason of faulty ignition, or where the mixture in the power cylinder has condensed because the system has been shut down, it becomes necessary to condition the engine for a subsequent power stroke. To this end, a self-starting device 40 is provided. This device comprises a cylinder 41 having a plunger 42 therein which is connected to bell crank 21 by link 43 and pin and slot connection 44. With the leverage relationships as shown, it would be necessary to construct plunger 42 with a greater cross-sectional area than plunger 35 since the former must overcome the resistance of the latter. Should a misfire occur and hence insufficient combustion pressure exist to return piston 12 on a power stroke, plunger 35 would move piston 12 beyond the normal point of travel where ignition would occur. This increase in travel would bring the pin in link 43 to the bottom of slot 44 and hence plunger 42 would be moved slightly to the left of its normally stationary position. Referring to Figs. 2 and 3, this movement displaces a cam 45, attached to plunger 42, to the left also, and as a result thereof, a pin 46 normally in engagement with the cam in the position as shown at 46a is moved laterally by the cam groove and into a deeper groove as shown at 46b under the urge of spring 48. Crosspin 49 attached to pin 46 thereupon forces lever 50 upwardly which in turn moves hydraulic actuators 51 and 52 downwardly. Hydraulic actuator 52 through the medium of the liquid in line 53 actuates plunger 54 opening valve 29 which permits liquid trapped in pump cylinder 19 to be returned to storage reservoir 25. Simultaneously with the foregoing, hydraulic actuator 51 through the medium of the liquid therebelow moves plunger 55 to the left, opening three-way valve 56 against the urge of compression spring 57. This permits flow of high pressure liquid into cylinder 41 by way of pipes 58 and 59 which moves plunger 42 to the right, carrying with it link 43 and bell crank 21 which in turn moves piston 12 to the piston shown, thus recharging the cylinder 11. At this point plunger 35 again takes over to return piston 12 to the end of the compression stroke to resume normal operation. Also at this point, pin 46 is moved to the position shown at 46c releasing crosspin 49 from beneath lever 50. This allows spring 57 to urge three-way valve 56 to its normal position where the liquid in 41 is in communication with low pressure reservoir 25 by way of conduits 59 and 60. As piston 12 moves toward the end of the compression stroke, plunger 42 and cam 45 move therewith, and pin 46 is moved to its original position at 46a with crosspin 49 again repositioned below lever 50 to repeat the foregoing starting operation when it again becomes necessary. When piston 12 is normally functioning on its power and recharge strokes, link 43 merely swings back and forth with one end riding in pin and slot connection 44, plunger 42 remaining stationary. A check valve 61 may be provided in line 60 to prevent pressure fluctuations in reservoir 25 from effecting operation of plunger 42.

The reversible turbine 26, previously mentioned, comprises a hub 80 mounted on shaft 27 and carries on the periphery thereof a plurality of variable pitch vanes 28. These vanes may be constructed to provide a fluid seal between their inner edges and the hub, between their outer edges and casing 81 in which they rotate, and between their radial edges so that when the vanes are in closed position, they act as a valve to prevent flow of liquid through the turbine. The pitch of the blades is controlled by a slidable control collar 82 which has a cam slot 83 thereon for each blade and into which a roller 84 engages. Each roller 84 is mounted on an arm 85 attached to a blade root so that axial movement of collar 82 cams the blades to a desired position. The arrangement of slots 83 and arms 85 is such that movement of collar 82 in one direction or the other from a position in which the blades are closed will adjust the pitch of the blades in either of two directions so that the turbine will rotate either in a forward or reverse direction. The amount of torque desired at shaft 27 is controlled by the blade pitch, an increase thereof permitting greater flow of liquid and hence greater torque, and a decrease thereof decreasing the torque. Liquid exhausted by the turbine flows into annular space 185 and thence to reservoir 25. To ensure against loss of pressure in reservoir 24 due to possible leaks in turbine 28 when the unit is shutdown, a valve 86 may be provided. Under some conditions of control, it may be found desirable to regulate the power requirements by valve 86 also; thus, for example, fixed pitch turbine blades could be provided and the flow thereto throttled by valve 86.

Figure 6:
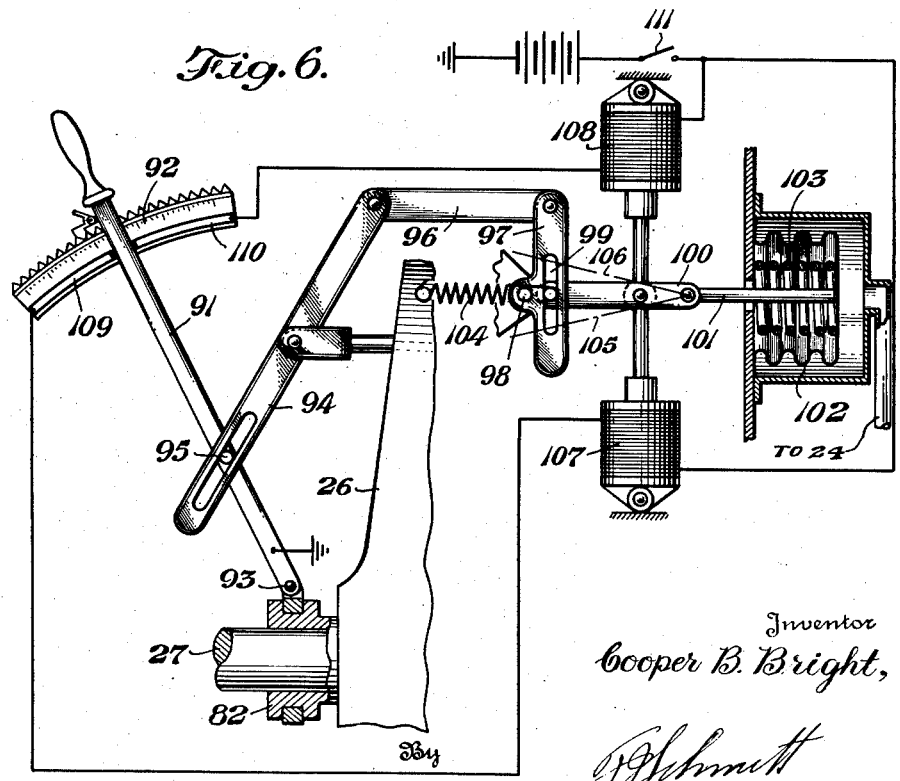
Fig. 6 is a view of an alternate turbine control mechanism.

In some instances, it will be desirable to construct air tank 32 of relatively small size in which case it would not be capable of maintaining constant pressure on the liquid in reservoir 24, as previously explained. In this event, a control as shown in Fig. 6 may be provided to eliminate fluctuations in power of the turbine which would result from fluctuations of liquid pressure in reservoir 24. In this modification a lever 91 is provided, one end of which may be locked at various positions in notches along quadrant 92 but free to pivot thereabout. The other end of lever 91 is connected to collar 82 by yoke and pivot 93. A bell crank 94 has one end thereof connected to lever 91 by pivot 95 and the other end to a link 96. Link 96 is connected to one end of lever 97 which is pivoted at its center 98. A slot 99 is provided in lever 97 extending on both sides of the center thereof, and a link 100 has one end slidably engaged therein. The opposite end of this link is connected to rod 101 which is connected to bellows 102, the outside of which is in fluid communication with reservoir 24. A suitable compression spring 103 urges the bellows 102 to the right. Link 100 would remain in the position shown under the urge of spring 104 when the unit is not in operation and in either position 105 or 106 when in operation, one position corresponding to a forward direction of turbine rotation and the other to a reverse direction of rotation. Assuming that the turbine blades are open to effect forward rotation and that link 100 is in the position shown at 105, an increase in liquid pressure on bellows 102 corresponding to a sudden pulsation would rotate bell crank 97 clockwise, which through link 96 and bell crank 94 would move control collar 82 toward its neutral or off position. This would reduce the turbine blade pitch, restrict liquid flow through the turbine and hence prevent the sudden increase in liquid pressure from affecting the smooth flow of power from shaft 27. Conversely, if the turbine is operating in reverse, link 100 would be positioned as shown at 106, and collar 82 would be positioned to reverse the blades as previously described. An increase in pressure on bellows 102 would move bell crank 97 counterclockwise and through link 96 and bell crank 94 again force collar 82 toward its neutral or off position thus compensating for the fluctuation as described for forward operation. It is apparent that while the foregoing has been described for an increase in pressure in reservoir 24, a decrease in pressure would cause the opposite effect, that is, a decrease would tend to open the turbine blades for momentary delivery of more liquid therethrough. To place link 100 in position 105 or 106, a pair of solenoids 107 and 108 are provided which are connected to suitable switches 109 and 110 on control quadrant 92. When lever 91 is initially moved from its off position to either forward or reverse, it completes a circuit to one or the other of solenoids 107 or 108, positioning link 100 in either position 105 or 106. Further movement of lever 91 will determine the turbine blade pitch and hence the power delivered by the turbine. When lever 91 is moved to its off position, it opens the circuit to either solenoid 107 or 108, and spring 104 instantly returns link 100 to the position shown. Thus, if an explosion should occur in cylinder 11 after the solenoid circuits are broken, the increase of liquid pressure resulting therefrom would not effect change of turbine blade pitch since link 100 would previously have been moved to an inoperative position by spring 104. If for any reason it is desired to render the positioning means inoperative, switch 111 may be left open. Also, when the arrangement for damping fluctuation is not employed, lever 91 may be the sole control, pivot 95 in this case being a fixed pivot and the remainder of the linkage connected thereto eliminated.

Figure 5:
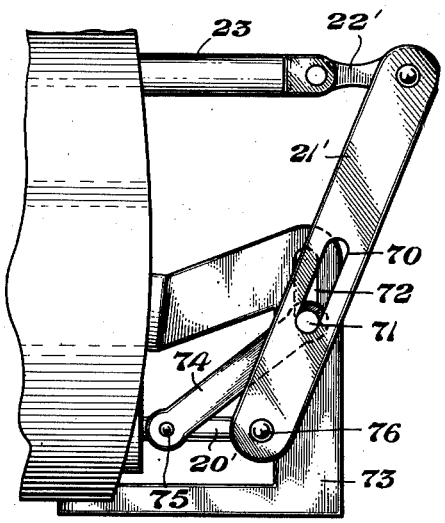
Fig. 5 is a view similar to Fig. 4 showing the linkage in another position.

In Fig. 1 bell crank 21 is illustrated as a simple lever pivoted intermediate its ends to promote clearness to the drawings. It is contemplated, however, that the lever 21 of Fig. 1 and its associated linkage may take the form as shown in Figs. 4 and 5 in which corresponding parts are indicated by primed reference characters. Bell crank 21' is grooved at 70 to receive a pin 71 which is slidable therein and also in another groove 72 in frame member 73. Link 74 connects pin 71 to pin 75 on connecting rod 20'. Connecting rod 20' is pivotally connected to bell crank 21' by pin 76. From Fig. 5 it can be seen that as piston rod 23 moves outwardly on the power stroke of piston 12, pin 71 slides in grooves 70 and 72 changing the mechanical advantage of the lever arm of 21 in favor of piston 12. Despite the decreasing pressures resulting from the expanding gases, this permits piston 12 to overcome the resistance of pump piston 18 which operates against substantially constant back pressure. It is thus possible to carry expansion in cylinder 11 to a point where optimum thermal efficiency may be obtained despite the constant resisting force against pump piston 18, thus increasing the overall efficiency of the entire power plant. It is to be observed, also, that on the compression stroke of piston 12 the mechanical advantage constantly increases in favor of the connecting rod 20' which is operated by plunger 35, and hence the increasing pressures of compression can be overcome thereby. In operation of the foregoing arrangement, the amount of fuel metered to the combustion chamber may be so regulated that the pressure of the expanding gases in the cylinder at any point of the expansion stroke will be just sufficient to overcome the back pressure exerted on pump piston 18 by the liquid in reservoir 24. The engine in this case would operate on a substantially true Otto cycle. If it is desired to increase the power output per stroke of piston 12, still retaining operation on a substantially true Otto cycle, the pressure in tank 32 may be increased, effecting a higher back pressure against which piston 18 must operate and increasing the amount of fuel delivered to the cylinder 12 per stroke to provide increased combustion and expansion pressures to overcome the higher back pressure on piston 18.

Figs. 7 and 8 show an alternate form of the linkage shown in Figs. 4 and 5, this modification permitting operation of the engine on a modified Otto cycle. The linkage is all identical to that of Figs. 4 and 5 except that link 74 is constructed in two parts 74a and 74b, connected by pivotal connection 74c, the two parts having limited pivotal movement between stops 74d and 74e. This latter linkage permits a delayed or lost motion connection between piston 12 and the fulcrum changing mechanism, that is, piston 12 may move part way out on its expansion stroke without changing the mechanical advantage in its favor but after reaching a predetermined point the fulcrum changing mechanism becomes operative, and the leverage increases in favor of piston 12 for the remainder of the stroke. Fig. 7 illustrates the position of the parts at the beginning of the expansion stroke with links 74a and 74b in one relationship, the distance between pins 75 and 71 being at a minimum. Fig. 8 illustrates the position of links 74a and 74b at the point corresponding to a predetermined position of piston 12 where the leverage in favor of piston 12 has commenced. Links 74a and 74b are now in their extended position with the distance between pins 75 and 71 at a maximum. Further movement of piston 12 on its expansion stroke will move pin 71 downwardly in slot 72 effecting an increase in leverage in favor of piston 12 in the same manner as described for the linkage of Figs. 4 and 5. With this arrangement, it is possible to modify the true Otto cycle slightly which is effected as follows: Assuming that the pump piston 18 is operating against the same back pressure as the modification of Figs. 4 and 5 and a larger amount of fuel is introduced into the power cylinder by opening the carburetor throttle valve, then the compression pressure would be higher and hence the peak pressure following ignition would tend to rise beyond that of the embodiment of Figs. 4 and 5. Since this pressure would be in excess of that required to overcome the resistance of pump piston 18 and since piston 12 is a free piston, the movement of which is determined by the difference between the forces of combustion and the resisting forces, it will tend to move outwardly so that the peak pressure above referred to would not be reached. The initial part of the expansion stroke would therefore approach a constant pressure curve, that is, a line parallel to the volume line on a pressure-volume indicator card. This pressure being constant, no increase in leverage in favor of piston 12 would be necessary until the pressure began to fall. At this point, the linkage 74a, 74b would have reached a point where the leverage in favor of piston 12 would commence and as the expansion pressures decrease on a curve simulating the expansion curve of an Otto cycle, the decreasing pressures would still be capable of overcoming the resistance of pump piston 18. It will be observed also that on the compression stroke, initial outward movement of pump piston 18 will first move links 74a, 74b to their relative position as shown in Fig. 7; further movement will then move pin 71 upwardly in slot 72 increasing the lever arm in favor of pump piston 18 so that as piston 12 approaches the end of its compression stroke, sufficient force is available to overcome the compression pressure.

In event that reservoir 24 is filled to capacity, this would preclude starting of the system, whereas if no high pressure liquid remains in reservoir 24, starting may be effected by auxiliary pump 77 which will transfer liquid from reservoir 25 to reservoir 24 and thus establish sufficient reserve energy in reservoir 24 to start the device in the normal manner previously described. It is apparent that the drive means for such pump may take any suitable form consistent with the requirements of the system as a whole. One example would be an electric motor.

The various parts of the device would, in perhaps most cases, be so designed and proportioned relative to one another to give optimum overall efficiency and in this connection, it should be observed that if a certain air pressure in tank 32 is chosen and also a fixed throttle setting in the carburetor, the engine will always operate on substantially the same thermodynamic cycle, and variations in power requirements of the turbine will change only the rate of such cycle; that is, for example, an increase in power requirements automatically effects more power strokes per unit of time by the engine, but its actual thermodynamic cycle remains substantially unchanged. The conventional engine, on the other hand, varies its thermodynamic cycle under change of load, and usually at full load the cycle is least efficient thermally. The advantages of this type of engine therefore become readily apparent since in this invention an optimum efficient thermodynamic cycle can be chosen which will remain the same under variation of load.

In some cases it may be desired to change the potential power output of the system, either by loading it over a designed optimum load or decreasing its loading from a designed optimum loading. The thermodynamic cycle attendant with such changes can be chosen in a simple manner by this invention. If a higher output is desired, for example, a greater air pressure is employed in air tank 32 by admitting air through valve 78. This, in turn, calls for a higher output by piston 12 so the carburetor throttle is merely opened in accordance with the increased power requirements. Similarly, if it is desired to reduce the potential power output, the air pressure is decreased and the throttle valve closed somewhat from its normal designed position.

While the previous description sets forth the expedience of the invention as a means to obtain uniform power from an intermittent power source, and especially one having a minimum number of working cylinders, it is to be observed that the device has equal application to installations where intermittent power is desired. The reserve energy in reservoir 24 is instantly available for requirements of the turbine whether they be continuous, variable, or intermittent torque, it only being necessary to adjust the turbine blades in accordance with the torque needs of shaft 27, and the remainder of the system automatically supplies these requirements.

It is apparent that while several specific embodiments of the invention have been described, this is intended only for purposes of teaching the principles of the invention rather than as a limitation thereon. The engine, for example, has been described as a two-cycle, air-cooled Otto type, but it is apparent that it could be liquid cooled or operated on other cycles such as the Diesel cycle wherein a fuel injector would be substituted for a spark plug and ignition would take place as a result of the heat of compression. Steam or other gases could also be employed as the expansible medium if so desired, the only requirement being that suitable valves would be incorporated to control entry and exhaust of the gas. The expandible bellows for effecting variable volume of the reservoirs could be in the form of pistons slidable in cylinders against the urge of suitable springs, and the turbine is subject to wide variations in its form. The various components, while illustrated in compact arrangement could be located in other suitable relationships depending on the installation requirements of the power plant. Similarly, the starting mechanism could be controlled by sundry means such as solenoid operated valves as will become apparent once the broad teachings of the invention are understood.

Further, the device, while disclosed as a system in which power is delivered to a shaft, could well function as a pumping device by merely eliminating the turbine and incorporating the remainder of the device in a fluid system which requires for its operation the movement of a liquid at a continuous rate, a variable rate, or an intermittent rate in either a closed or open circuit. Thus, as a pump means in a closed circuit, the invention could be employed with any device which requires for its operation a flow of liquid under differential pressure; in an open circuit, it could receive liquid from any source of supply and deliver a column of liquid to effect useful work. As an example of the latter, the invention could be employed for hydropropulsion.

It is accordingly intended that the claims to follow should be construed in terms of the broad teachings above set forth and not as limited to the exact embodiments illustrated.

The invention described herein may be manufactured and used by or for the Government of the United States of America for governmental purposes without the payment of any royalties thereon or therefor.

What is claimed is:

1. A power plant comprising a cylinder and an enclosed piston having a power stroke and a return stroke, pumping means including a plunger having a suction and a delivery stroke, linkage means including an oscillating lever operatively connecting said piston and said plunger so that said piston on its power stroke drives said plunger on its delivery stroke, an expansible reservoir operatively connected with said pumping means for receiving and storing fluid supplied by said pumping means, a fluid motor operatively connected to said plunger, said fluid motor being mounted with respect to said reservoir for operation by pressure fluid received therefrom so that said fluid motor drives said plunger on its suction stroke and said piston on its return stroke.

2. A power plant comprising; an engine having a piston movable in response to the diminishing pressure of an expanding gas during its work-delivering stroke, liquid pump means operable against a substantially constant back pressure during its liquid-delivery stroke, means connecting said piston and said pump means in a manner such that as the pressure of the expanding gas decreases the mechanical advantages in favor of the piston increases, means associated with the connecting means aforesaid and operable by the liquid under constant pressure for moving the piston through its compression stroke, the arrangement being such that as the compression pressure increases the mechanical advantage in favor of the last-named means also increases.

3. In an engine of the type having a wall movable in response to the diminishing pressure of an expanding gas, the combination comprising; a device operable between two positions against a constant resistive force, and a lever having a movable fulcrum for connecting said device to said movable wall in a manner such that as the gas pressure diminishes the mechanical advantage of said wall increases whereby the relatively small unit gas pressure resulting at optimum expansion can overcome a relatively large constant resistive force applied to said device.

4. A member movable between two positions under application of a variable force applied thereto, another member movable between two positions under a substantially constant pressure applied thereto, a lever interconnecting said members having a movable fulcrum, and means responsive to the movement of said lever for moving said fulcrum in such manner that as the varying force decreases, the mechanical advantage in its favor increases.

5. A power plant comprising; a combustion engine having a piston movable through a compression stroke and a power stroke, a reciprocating fluid pump having an intake and a delivery stroke, a bell crank connecting said engine to said pump for operating said pump on its delivery stroke during the power stroke of said engine, and expansible reservoir to which said pump delivers working fluid, accumulator means for applying pressure to said reservoir to maintain said working fluid under substantially constant pressure, motive means operable by the fluid in said reservoir for moving said engine piston through its compression stroke, a second motive means operable by the fluid in said reservoir for moving said piston through its normal power stroke in event of a misfire, a fluid motor operable by the fluid in said reservoir, and passage means for returning liquid from said fluid motor to the inlet of said pump including a second expansible reservoir.

6. A power plant comprising; an engine having a piston movable in response to gas pressure thereon during its work delivery stroke, a liquid pump operable against a constant back pressure during its liquid delivery stroke, lever means having a movable fulcrum for connecting said piston and pump means, and means responsive to the oscillation of said lever for moving said fulcrum in a manner such that the mechanical advantage in favor of the piston remains constant during a portion of its work delivery stroke and increases during another portion thereof.

7. An internal combustion cylinder and piston having a power stroke and a compression stroke, a fluid circuit, a reciprocating pump including a stepped piston slidably mounted in a pumping chamber having a relatively large cross-sectional area and inlet and outlet check valves, said pump being positioned in said circuit for driving said fluid from a low pressure part of said circuit to a high pressure part, said stepped piston having a reduced cross-sectional area plunger portion with its end exposed to said high pressure circuit part to act as a fluid motor, accumulator means for maintaining said high pressure substantially constant with a change in volume of said part, mechanical drive linkage between said combustion piston and said pump for transmitting the power stroke movement to drive said pump on its delivery stroke and for transmitting the driving stroke of said motor to drive said piston on its compression stroke.

8. The combination defined in claim 7, said inlet valve being in communication with said low pressure part of said circuit, and said outlet valve being in communication with said high pressure part.

9. The combination defined in claim 8, and a main fluid motor in said circuit between said high pressure and low pressure parts driven by said fluid.

10. The combination defined in claim 9, and means for controlling the flow of fluid through said main fluid motor for adjusting its power.

11. The combination of claim 10, wherein said main motor is of the axial flow vane type.

12. The combination defined in claim 11, wherein said vanes are adjustable on radial axes and means for adjusting them to control the torque delivered by said main motor.

13. The combination defined in claim 12, wherein said means for controlling the flow of fluid through said main fluid motor is a control valve between said high pressure part and said main motor for controlling its power.

14. The combination set forth in claim 7, further characterized in that said inlet valve is in communication with said low pressure part of said circuit, and said outlet valve is in communication with said high pressure part, and movable means connected to the said piston, control means responsive to low fire pressure in the combustion cylinder caused by a mis-fire for connecting the said movable means to the pressure of the high pressure part for moving said movable means and the piston on its return stroke in the event of misfire.

15. The combination set forth in claim 14, further characterized in that the resilient accumulator is enclosed within a pressure housing.

16. The combination set forth in claim 7, further characterized in that the low pressure part is interconnected with the high pressure part by means including a standby pump and driving means therefor, said standby pump being operable to build up and maintain the desired pressure in the high pressure part for starting and during faulty firing in the internal combustion chamber.

COOPER B. BRIGHT.

REFERENCES CITED

The following references are of record in the file of this patent:

UNITED STATES PATENTS

| Number | Name | Date |
| --- | --- | --- |
| 1,021,241 | Fish | Mar. 26, 1912 |
| 1,079,898 | Chance | Nov. 25, 1913 |
| 1,093,280 | Ludwig | Apr. 14, 1914 |
| 1,114,108 | Chance | Oct. 20, 1914 |
| 1,190,637 | Domscheit | July 11, 1916 |
| 1,356,032 | Angus | Oct. 19, 1920 |
| 1,515,933 | Crowder | Nov. 18, 1924 |
| 2,230,760 | Pateras Pescara | Feb. 4, 1941 |
| 2,289,005 | Frisone | July 7, 1942 |
| 2,344,058 | Pateras Pescara | Mar. 14, 1944 |
| 2,393,324 | Joy | Jan. 22, 1946 |
| 2,415,915 | Sloane | Feb. 18, 1947 |